United States Patent
O'Hara et al.

(10) Patent No.: US 11,431,750 B2
(45) Date of Patent: Aug. 30, 2022

(54) DETECTING AND MITIGATING APPLICATION LAYER DDOS ATTACKS

(71) Applicant: Arbor Networks, Inc., Westford, MA (US)

(72) Inventors: Sean O'Hara, Ypsilanti, MI (US); Steinthor Bjarnason, Fjerdingby (NO)

(73) Assignee: Arbor Networks, Inc., Westford, MA (US)

( * ) Notice: Subject to any disclaimer, the term of this patent is extended or adjusted under 35 U.S.C. 154(b) by 295 days.

(21) Appl. No.: 16/875,560

(22) Filed: May 15, 2020

(65) Prior Publication Data
US 2021/0360023 A1 Nov. 18, 2021

(51) Int. Cl.
*H04L 9/40* (2022.01)

(52) U.S. Cl.
CPC ...... *H04L 63/1458* (2013.01); *H04L 63/0236* (2013.01); *H04L 63/1416* (2013.01)

(58) Field of Classification Search
CPC ............ H04L 63/1458; H04L 63/0236; H04L 63/1416; H04L 63/101
See application file for complete search history.

(56) References Cited

U.S. PATENT DOCUMENTS

| | | | |
|---|---|---|---|
| 10,666,620 B1* | 5/2020 | Clemons | H04L 63/10 |
| 2019/0334940 A1* | 10/2019 | Bar Noy | H04L 63/0245 |

* cited by examiner

*Primary Examiner* — Huan V Doan
(74) *Attorney, Agent, or Firm* — Locke Lord LLP; Scott D. Wofsy; Christopher J. Capelli

(57) ABSTRACT

A system and method for detecting a Denial of Service (DoS) attack. A number of evaluator elements (M) is determined for DoS analysis for network connection requests wherein each evaluator element is preferably associated with a component of the analyzed connection request. A DoS evaluator element score is determined for an evaluator element of the connection request by analyzing the evaluator element. DoS mitigation actions may be performed on the connection request if the determined evaluator element score is indicative of a DoS attack. An evaluator consolidated score (which may be weighted) is then calculated preferably consisting of one or more of the respective DoS evaluator element scores. Next, a determination is made as to whether each evaluator element of the M evaluator elements has been analyzed for determining a respective DoS evaluator element score. If no, a DoS evaluator element score for a succeeding evaluator element to be analyzed is then determined. And if yes, a determination is then made as to whether the value of the evaluator consolidated score is indicative of a DoS attack by the subject analyzed network connection request.

18 Claims, 4 Drawing Sheets

DETECTING AND MITIGATING APPLICATION LAYER DDOS ATTACKS

FIELD OF THE INVENTION

The disclosed embodiments generally relate to the detection and prevention of malicious attacks over computer networks and, more particularly, to the detection and mitigation of application layer DDoS network attacks.

BACKGROUND OF THE INVENTION

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks, and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A Distributed Denial of Service ("DDoS") attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name System ("DNS") servers, etc. Examples of a DDoS attack include (but are not limited to): large quantities of raw traffic designed to overwhelm a resource or infrastructure; application specific traffic designed to overwhelm a particular service; traffic formatted to disrupt a host from normal processing; traffic reflected and/or amplified through legitimate hosts; traffic originating from compromised sources or from spoofed IP addresses; and pulsed attacks (which start/stop attacks). Further, it is to be understood DDoS attacks are typically categorized as: TCP Stack Flood Attacks (e.g., flood a certain aspect of a TCP connection process to keep the host from being able to respond to legitimate connections (which may also be spoofed)); Generic Flood Attacks (e.g., consists of a flood of traffic for one or more protocols or ports, which may be designed to appear like normal traffic which may also be spoofed)); Fragmentation Attacks (e.g., consists of a flood of TCP or UDP fragments sent to a victim to overwhelm the victim's ability to re-assemble data streams, thus severely reducing performance); Application Attacks (e.g., attacks designed to overwhelm components of specific applications); Connection Attacks (e.g., attacks that maintain a large number of either half-open TCP connections or fully open idle connections); and Vulnerability Exploit Attacks (e.g., attacks designed to exploit a vulnerability in a victim's operating system).

A particular DDoS attack that has proven difficult to detect is Application Layer DDoS attacks. This is because attackers often focus on overwhelming application servers by sending either large volumes of correctly constructed connection requests or by sending carefully constructed connection requests that consume inordinately large resources of the targeted application servers. It is often the scenario that in existing mitigation devices and methods, such Application Layer DoS attacks are difficult to distinguish from legitimate application server connection requests. Consequently, considerable manual effort has been required to detect legitimate server connection requests from malicious server connection requests in connection with a DoS attacks upon the network servers.

The architecture of the Internet makes networks and network devices vulnerable to the growing problems of DDoS attacks. Therefore, the ability to avoid or mitigate the damages of an application level DDoS attack, while preventing blocking of valid application server connection requests, is advantageous to devices located in a protected network.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a system and method for detecting application level DoS attacks is provided which analyzes a mix of legitimate and attack network traffic to identify malicious traffic (e.g., malicious application server connection requests) by aggregating, and weighing, the results of multiple analysis methods, known as "Evaluators" described herein. In accordance with certain illustrated embodiments, the aggregated value of evaluators is preferably a combined value which when compared against previous values (e.g., previously specified limits), enable detection of stealthy, difficult to detect, DDoS application level attacks. After detection, the attack can be mitigated using one or more techniques.

To achieve these and other advantages and in accordance with the purpose of the illustrated embodiments, in one aspect, a system and method for detecting a Denial of Service (DoS) attack in a network by a network monitoring device is described in which intercepted are data communications occurring between one or more external computers in a monitored computer network. Particularly, the intercepted data communications are seeking connection with one or more host devices in the protected computer network (e.g., connection requests). For each connection request, a number of evaluator elements (M) is determined for DoS analysis wherein each evaluator element is preferably associated with a component of the analyzed connection request. Next, a DoS evaluator element score is determined, preferably starting with a first evaluator element of the M evaluator elements, by analyzing the evaluator element using prescribed criteria to determine a DoS evaluator element score. In accordance with certain illustrated embodiments, one or more DoS mitigation actions may then be performed on the connection request if the determined evaluator element score of the analyzed evaluator element is indicative of a DoS attack, thereafter, preferably no further actions may be performed regarding the subject analyzed connection request.

If the analyzed evaluator element was determined not indicative of a DoS attack, an evaluator consolidated score is then calculated consisting of one or more of the respective DoS evaluator element scores associated with the respective analyzed evaluator element. Next, a determination is made as to whether each evaluator element of the M evaluator elements has been analyzed for determining a respective DoS evaluator element score regarding a subject connection request. If no (each evaluator element of the M evaluator elements has not been analyzed), a DoS evaluator element score for a succeeding evaluator element to be analyzed is then determined. And if it was determined each evaluator element of the M evaluator elements has been analyzed, then a determination is made as to whether the value of the evaluator consolidated score is indicative of a DoS attack by the subject analyzed connection request.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
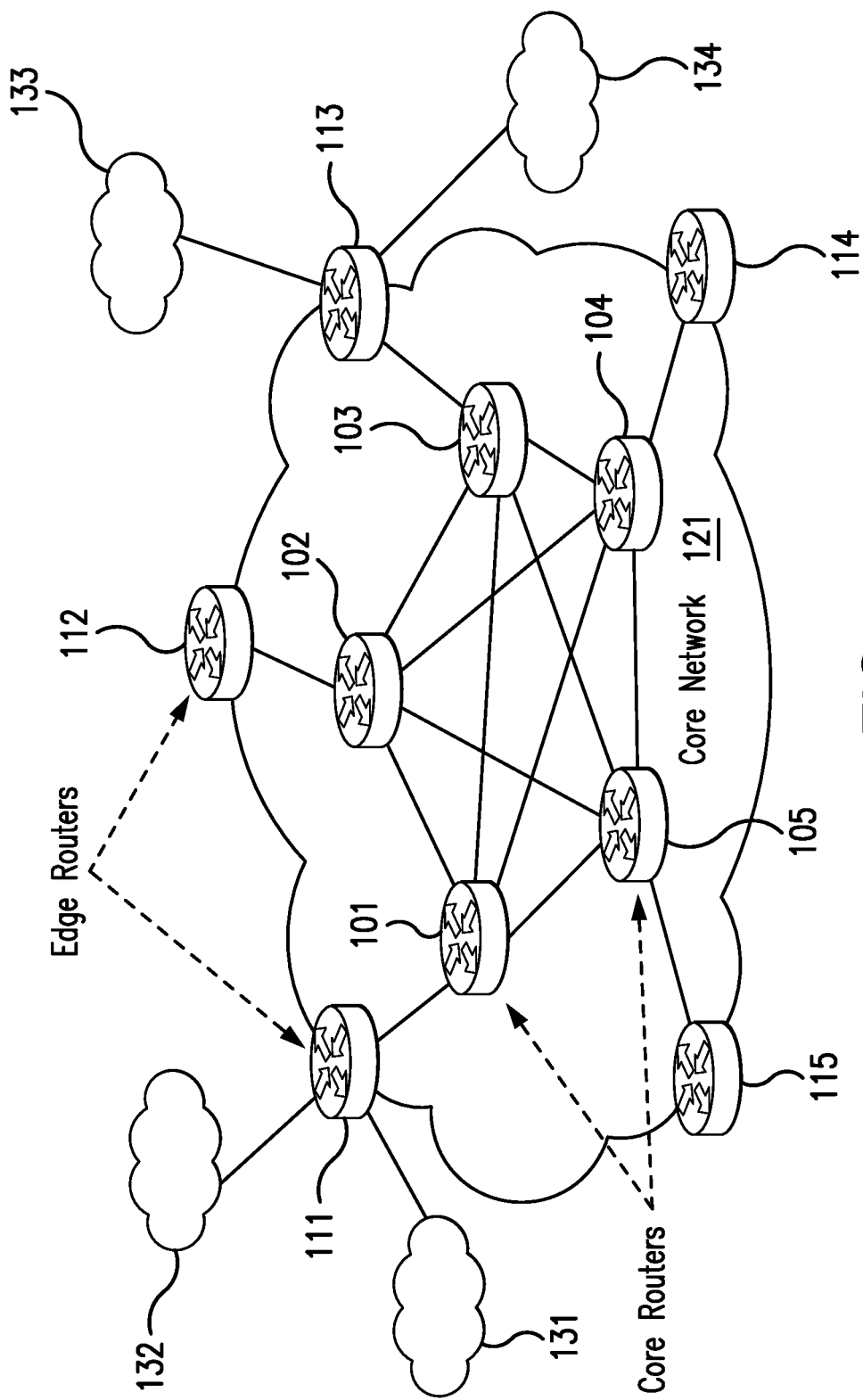
FIG. 1 is a schematic diagram illustrating a general structure of an ISP network wherein the system and method of the illustrated embodiments generally may be utilized.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

It is to be further understood the illustrated embodiments of the present invention describe a system, apparatus and method for avoiding and mitigating the harmful effects of a DDoS attack (e.g., an Application Level attack) on a computer system/device or network.

Turning now descriptively to the drawings, in which similar reference characters denote similar elements throughout the several views, FIG. 1 illustrates a general structure of an ISP network wherein the system and method of the illustrated embodiments generally may be utilized (but are not to be limited thereto). The ISP network in FIG. 1 is preferably composed of two types of IP routers: core routers 101-105 and edge routers 111-115. The core routers interconnect with one another to form a core network 121, which is responsible for exchanging data for defined networks, such as protected network 200, described below. By contrast, edge routers are responsible for connecting external networks 131-134 with the core network 121.

Figure 2:
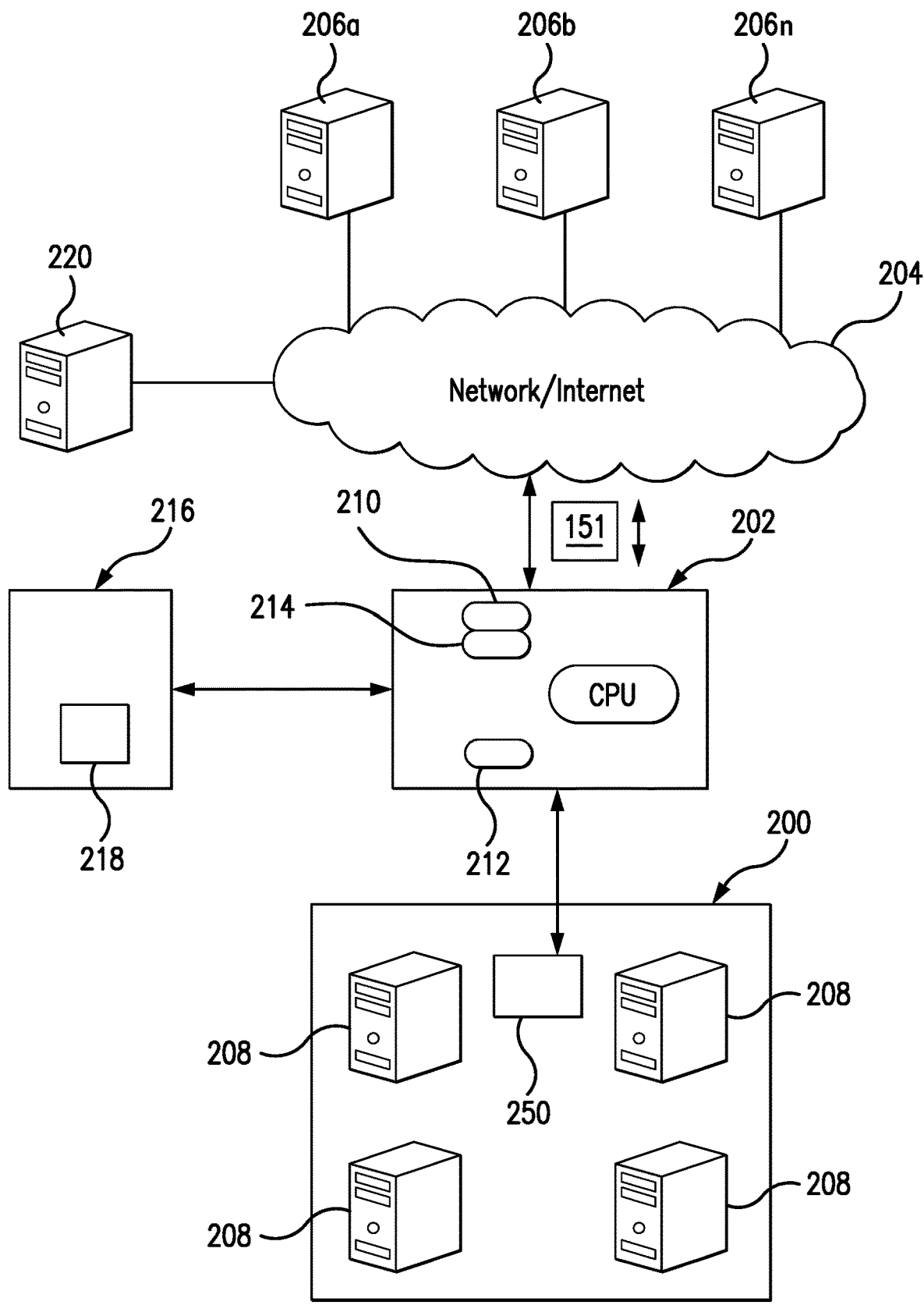
FIG. 2 is a schematic diagram showing network architecture and the relationship between an edge router device and a protected network according to the illustrated embodiments.

With the general structure of an ISP network described above (FIG. 1), reference is now made to FIG. 2 illustrating the relationship between a network monitoring device 202, core router device 250, protected network 200, Internet 204, and external host devices 206a-206n, 220.

In a typical implementation, the external host devices 206a-206n, 220 (also referred to as external devices or host devices) attempt to connect to protected devices 208 within the protected network 200 typically via a private network or a public computer network such as the Internet 204. Examples of external host devices include servers, laptops, desktop computers, tablet devices, mobile phones, mobile computing devices, video games systems, televisions and other similar devices and systems having Internet connectivity.

In a preferred embodiment, the protected network 200 is protected by a network monitoring device 202, which is shown as an edge router device in FIG. 2. It is to be appreciated that in accordance with the illustrated embodiments, network monitoring device 202 is shown as an edge router device in FIG. 2 for illustrative purposes only as it is to be understood network monitoring device 202 is not to be limited to such an edge router device as it may also be configured as a core router device 250. For instance, the network monitoring device 202 may be embodied in the Arbor Sightline/TMS monitoring device commercially available from NetScout Technologies Inc. It is to be understood the network monitoring device 202 is preferably configured and operable to detect both encrypted and non-encrypted application layer DDoS attacks using a combination of multiple detection methods, as described herein. It is to be appreciated the efficiency of the process described herein is heightened when analyzing non-encrypted, or decrypted traffic, since it provides better insight into application traffic transmitting from the monitored network 204.

Preferably operatively coupled to the network monitoring device 202 is a network management system 216 operatively associated with one or more databases 218. Usually, the protected network 200 is an enterprise network, such as a school network, business network, and government network, to list a few examples. Network management device 216, and network monitoring device 202, are to be understood to include computer resources necessary to carry out the functionality of the illustrated embodiments as described herein.

The network monitoring device 202 preferably includes a packet processing system having an external high-speed network interface 210 and a protected high-speed network interface 212 and a storage device 214. Under current technology, these interfaces are capable of handling 1.0-100 Gbps, for example. The network monitoring device 202 may further include processors that preferably process the packets received at interfaces 210 and 212.

Figure 3:
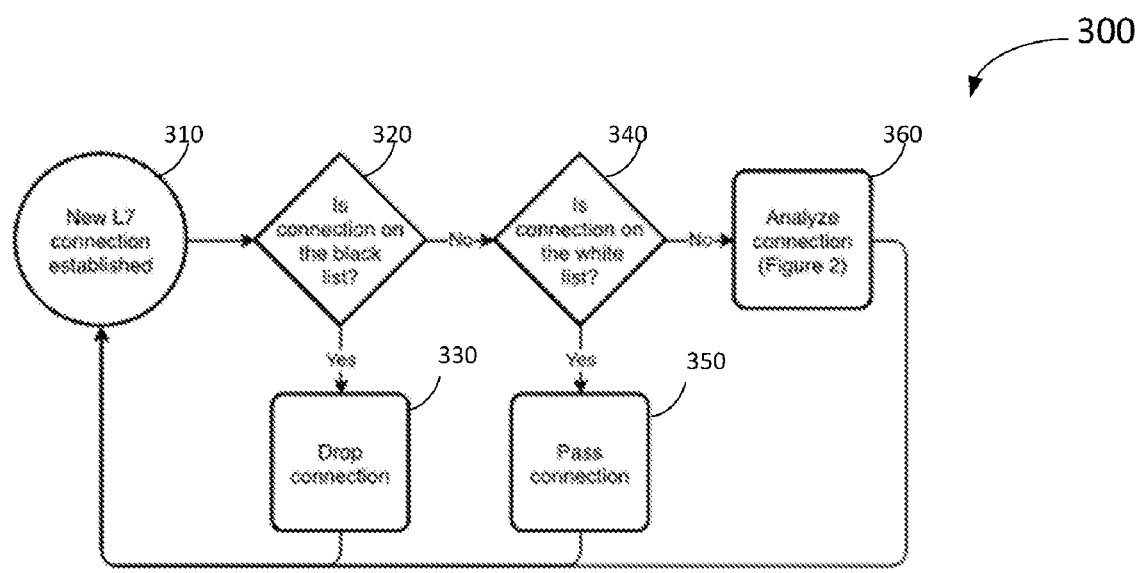
FIGS. 3 and 4 are flow charts depicting operation of the certain illustrated embodiments.
Figure 4:
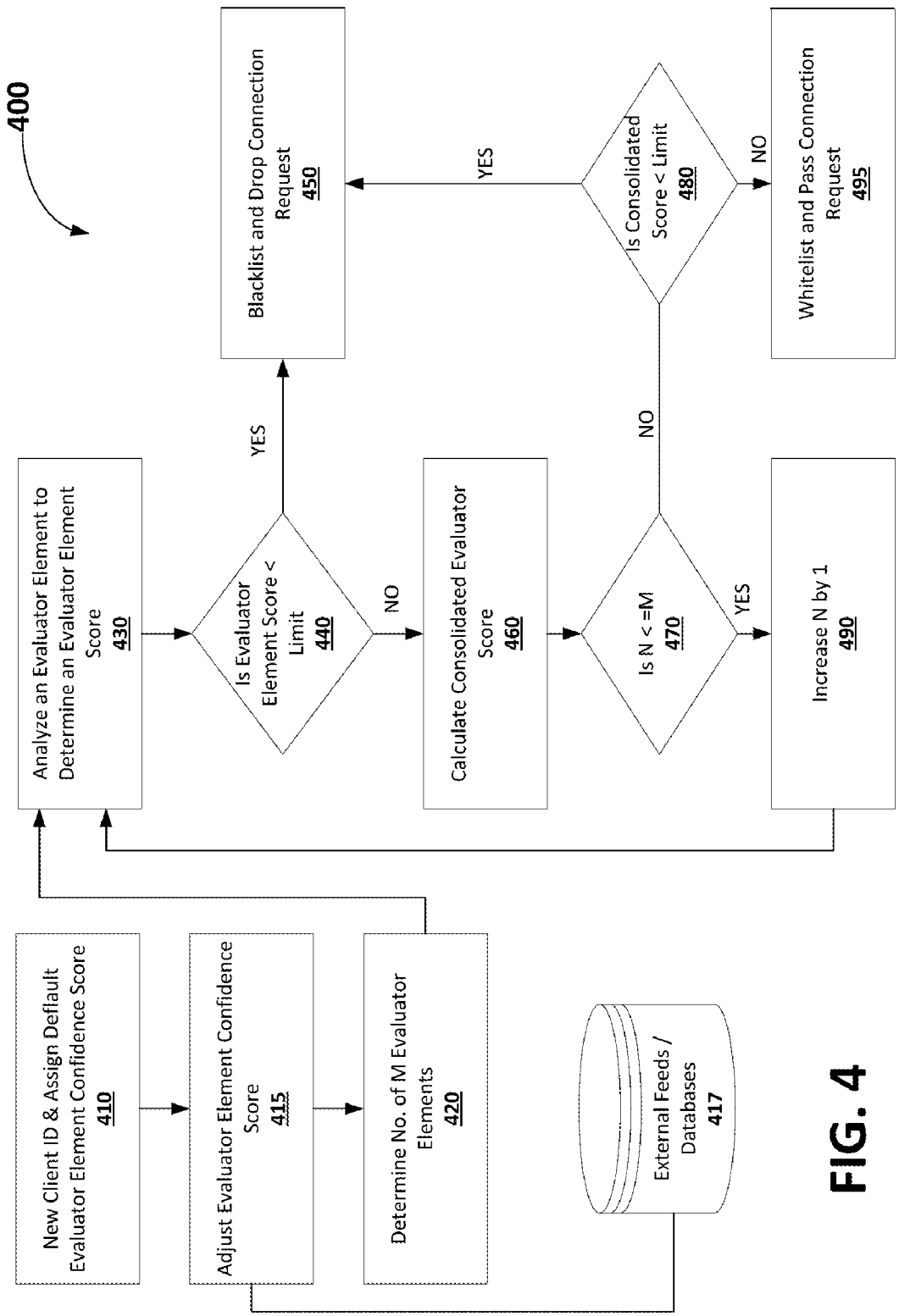

With reference now to FIGS. 3 and 4 (and with continuing reference to FIG. 2), description of operation of the network monitoring device 202 in accordance with the certain illustrated embodiments will now be provided. As described in more detail below, the network monitoring device 202 is configured and operable to analyze legitimate and attack network traffic to identify malicious traffic preferably associated with application layer DoS attacks. The network monitor 202 consolidates, and preferably weighs, evaluator element scores associated with a network connection request subject to DoS analysis for detecting the presence of an application layer DoS attack in accordance with the below description. Before turning to the descriptions of FIGS. 3 and 4, it is noted that the illustrated flow diagrams are shown by way of example, with reference to components shown in FIG. 2. Although it is to be understood these operational steps may be carried out in any system and are not limited to the scenario shown in the aforementioned figures. Additionally, the flow diagrams of FIGS. 3 and 4 illustrate examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may also be included.

Starting reference now to FIG. 3 (and with continuing reference to FIG. 2), shown is a flowchart depicting certain operational steps (process 300) performed by the network monitoring device 202 in accordance with illustrative embodiments. Starting at step 310, in a traffic flow 151 received by the network monitoring device 202, included in the traffic flow is data packets transmitting to and from external devices 220, 206a-206n with one or more protected devices 208 (e.g., servers). Data communications (e.g., server connection requests) occurring between one or more external computers 220, 206a-206n in a monitored computer network 204 seeking connection, via a server connection request (which is typically a layer 7 (application layer) request), with one or more host devices 208 in the protected computer network 200 are intercepted by the network monitoring device 202. The network monitoring device 202, upon network interception of the aforesaid server connection request, preferably determines a client connection identifier (connection id) associated with the connection request (step 310). Next, network monitoring device 202 preferably determines if the connection id associated with the connection request is associated with a predetermined DoS attack risk (e.g., is it on a blacklist) (step 320). If yes, the connection request is preferably dropped and no thus no further mitigation actions are performed on this connection request by the network monitoring device 202 (step 330). If no (step 320), the connection id associated with the connection request is determined not associated with a predetermined DoS attack risk, then the network monitoring device 202 determines if the connection id is associated with a white list (e.g., a listing of legitimate traffic) (step 340). If yes, the connection id is associated with a white list, then network connection of the connection request is permitted and thus no further mitigation actions are performed on this connection request by the network monitoring device 202 (step 350). If however the connection id is neither associated with a predetermined DoS attack (step 320) nor a whitelist (step 340), then the subject connection request is determined to be a "new connection request" (e.g. it is neither on a blacklist nor whitelist) and analysis of the subject connection request proceeds to process 400 (step 360), which analyzes the connection request to determine if it is associated with an application layer DoS network attack, as now described below with reference to FIG. 4 (and with continuing reference to FIG. 2).

Starting at step 400, when a connection request is determined a new connection request (step 360), each new connection request is assigned a client connection id and a default evaluator consolidated confidence score, which is preferably set to zero (0) (step 410). It is to be appreciated the client connection id consists of certain components included in the connection request. For instance (and not to be understood to be limited thereto), for an HTTP layer 7 connection request, the connection id may consist of the following components: protocol; source IP; destination IP; source port; destination port; and stream-id. It is to be understood that with regards to the stream-id, it is preferably included because certain client devices 220, 206a-206n may establish a connection using HTTP/2 or QUIC protocols. These protocols permit connections consisting of multiple streams, where each stream is independent from each other, and can in some scenarios, originate from different client devices (206a-206n, 220). Hence, a single stream in a connection request having multiple streams can be malicious while other streams are legitimate. In accordance with the illustrated embodiments, for all other type of connections, the stream-id is preferably set to zero (0) so as to be disregarded for further analysis purposes.

Next, and preferably utilizing the source IP address of the connection request, a lookup is performed (which preferably determines if the source IP address of the connection request is associated with either known good or bad traffic) to determine if the aforesaid default evaluator consolidated confidence score is to be adjusted (step 415). For instance, if the source IP address of the connection request is determined to be associated with known good traffic, then the evaluator consolidated confidence score associated with the connection request is adjusted upwards. Conversely, if the source IP address is determined to be associated with known bad (malicious DoS) traffic than the evaluator consolidated confidence score associated with the connection request is adjusted downwards. It is to be appreciated that the lookup of the source IP address of the connection request is performed preferably utilizing external feeds and/or databases 417 (e.g., 218). For instance, with regards to a trusted client device 220 which performs large and CPU intensive requests using an Application Program Interface (API), its associated default evaluator consolidated confidence score is adjusted upwards to avoid it being classified as malicious. Alternatively, if a source IP address of a connection request has been known to previously been used to launch DDoS attacks against other deployments within a certain time period (e.g., 48 hours), then its default evaluator consolidated confidence score is adjusted downwards since there is a high likelihood the subject connection request is malicious.

Upon determining whether or not the aforesaid evaluator consolidated confidence score is to be adjusted (step 415), a number of M evaluator elements (which may be preferably dependent upon the type of connection request) is then determined for the connection request, which as described herein are utilized for subsequent DoS analysis (step 420). In accordance with the illustrated embodiments, it is to be appreciated that depending on the type of the server connection request (e.g., an HTTP connection request), a prescribed number of "evaluator elements" is assigned to an "evaluator chain" that is associated with a connection request. As described herein, each evaluator element of an evaluator chain serves to evaluate the connection request with regards to preferably an application layer DoS attack. Preferably, the number of evaluator elements in the evaluator chain is assigned to the value M, and initially the value 1 is assigned to an evaluator element counter value "N" (as also described below). For instance, for an exemplary HTTP connection request, five (5) evaluator elements (e.g., M=5) may assigned to an evaluator chain which preferably consist of: 1) application activity analysis; 2) inter-packet delay; 3) L3/L4 analysis; 4) L7 protocol analysis; and 5) HTTP Application activity monitoring associated with the subject HTTP connection request.

Next, and preferably starting with analysis of a first evaluator element of the M evaluator elements (e.g., application activity) (e.g., wherein evaluator element counter N=1), an evaluator element score is determined using prescribed criteria based upon the evaluator element type (step 430). In accordance with the illustrated embodiments, each evaluator element preferably performs its own analysis, gathers its own data, and compares it to a set of static, parameterized and learned values. For instance, examples of evaluator elements include (e.g., for an HTTP connection request): 1) application activity analysis (e.g., user generated activity will follow a specific distribution, often containing spikes of activity followed by periods of little activity, thus indicating legitimate traffic); 2) inter-packet delay analysis (e.g., regular inter-packet delay is a good indicator that packets are generated by bots (or automated clients using API's) and thus are potentially malicious); 3) L3/L4 Protocol analysis (e.g., determine if traffic is using fixed or random values for common fields by comparing these with typical learned values for indicating malicious generated traffic (a typical indicator in bot traffic)); 4) L7 protocol analysis (e.g., analysis of L7 protocol header values often indicates values generated by bots (i.e., HTTP User-Agent is often fixed or does not follow typically seen distributions which is indicative of malicious traffic)); and 5) geographic proximity analysis (e.g., compare the geographical location and the Time-to-Live (TTL) value of client being analyzed against a known set of typical geographical location(s) seen for legitimate clients). It is to be appreciated that certain evaluator elements may require a set of learned values, preferably gathered and calculated when there is no attack ongoing thus permitting comparison of current values (usually consisting of attack data) against normal non-attack data. Preferably, after performing the aforesaid analysis of an evaluator element to determine an evaluator element score, an evaluator score is assigned a value in the range of 0 to −1. A value of 0 indicates that analysis of the evaluator element did not indicate any abnormal activity (e.g., indicative of legitimate traffic) while a negative value will indicate the severity of abnormal activity detected (e.g., indicative of the severity of possible malicious traffic).

In accordance with certain illustrated embodiments, a determination is made as to whether one or more DoS mitigation actions are to be performed on a connection request if an aforesaid evaluator score of an analyzed evaluator element is indicative of a DoS attack (step 440). For instance, a determination is conducted if an evaluator element score determined in step 430 is below a specified limit. If yes, one or more DoS mitigation actions may be performed on the connection request using an appropriate mitigation mechanism (e.g., blacklisting and/or dropping the connection request)(step 450), and further preferably no other mitigation actions need to be performed with regards to a subject connection request. It is to be further appreciated that in accordance with other illustrated embodiments, in the event an evaluator score is below a specified limit but still above a prescribed lower limit (which limits may be user determined), the associated connection request may then be redirected to be subjected to other specific mitigation services which are more tolerant to attacks as opposed to simply dropping a connection request.

Next, at step 460, the evaluator consolidated score, preferably consisting of aggregation of the evaluator element scores, is updated to include the evaluator element score determined in step 440 for a subject analyzed connection request. Thus, evaluator element scores included in the evaluator consolidated score are those preferably determined in step 440 not to warrant immediate mitigation actions (step 450). It is to be appreciated that the aforesaid evaluator consolidated score, alternative to consisting of an aggregation of the evaluator element scores, may consist of alternate scores for the purposes of learning which scores are effective, and which are noise. For instance, if there are 4 evaluators (e.g., M=4), there may then be 4 separate evaluator element scores whereby each score may be calculated the same as the default case (e.g., the aggregated score) except that one of the sub-scores is not included in the aggregation. This would provide 4 distinct scores (each comprised of 3 sub-scores). Thus, a determination can be made as to whether if any of the evaluators are skewing the results for the default case so as to ignore that evaluator element.

In accordance with the illustrated embodiments, it is to be appreciated that the evaluator element scores determined in step 440 will by default have equal weight. However, the determined evaluator element scores may be weighted to increase the impact of the determined evaluator element scores on the evaluator consolidated confidence score. For instance, an evaluator element score determined in step 440 may measure the geographical distribution of clients (e.g., 220, 206a-206n) and if attackers are using bots from geographies not commonly seen, the determined associated evaluator element score would nevertheless return only a slightly negative value. Thus, the evaluator element score can then be weighted downwards during an attack which is known to consist primarily of remote botnets indicating increased likelihood of a malicious attack. Upon weighing the evaluator element score, it is then preferably added to the evaluator consolidated confidence score, which as stated above, is representative of all the determined evaluator element score values associated with a subject analyzed connection request.

Next, at step 470, a determination is made as to whether if each of the M evaluator elements (wherein M was determined in step 420) has been analyzed to determine an evaluator element score (as determined in step 430). This is preferably accomplished by use of the current value (N) of the evaluator element counter whereby a determination is made as to whether if the counter value N is equal to or less than the value M (the number of determined evaluator elements). If no, this is indicative that all of the M evaluator elements assigned to an Evaluator chain (as determined in step 420) have analyzed (as conducted in step 430) and analysis is now performed with regards to a DoS threat based upon analysis of the value of the evaluator consolidated confidence score in step 480. However, if counter value N is not equal to or less than the value M (step 470), this is indicative that not all of the M evaluator elements assigned to an evaluator chain for a connection request have analyzed (step 430), and thus the evaluator element counter value N is preferably increased by one (1) and the current process 400 returns to step 430 for analysis with regards to a next evaluator element (of the M evaluator elements) in the evaluator chain not yet analyzed.

Returning to determining that each of the M evaluator elements has been analyzed (step 470), then at step 480 a determination is made as to whether if the value of the evaluator consolidated score (calculated in step 460) is indicative of a DoS attack by the subject analyzed connection request. In accordance with the illustrated embodiments, this is preferably accomplished by determining if the evaluator consolidated score is below a specified limit. If yes, this is indicative that the subject analyzed connection request is associated with a DoS attack and the process 400 proceeds to step 450 for mitigation actions as described above. If no, the consolidated evaluator confidence score is above the aforesaid specified limit (which limit may be user configurable), then the subject analyzed connection request is determined associated with legitimate traffic and is preferably whitelisted and permit to connection as normal with a requested device 208 in a protected network 200.

With the certain illustrated embodiments described above, it is to be appreciated that certain advantages of the certain illustrated embodiments include that process 400 (as described with exemplary use by network monitoring device 202) is configurable and operable for use in a distributed manner, whereby evaluator elements may deployed in efficient locations, and further, the correlation and consolidated element evaluations may be performed at a central location, using appropriate mitigation methods. Thus, aggregation of multiple DDoS detection methods is enabled facilitating analysis of Application Layer DDoS attack traffics in multiple dimensions using both static, parameterized and learned values for rendering efficient DoS detection. A further advantage is enablement of integration of threat-intelligence and parameter-based feeds, permitting users (e.g., network administrators/engineers) to gain the benefits of DDoS research without requiring software updates when utilizing a network monitoring device 202.

With the illustrated embodiments discussed above, it is to be appreciated the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer method for detecting a Denial of Service (DoS) attack in a network by a network monitoring device, the computer method comprising the steps:

intercepting data communications occurring between one or more external computers in a monitored computer network seeking connection with one or more host devices in the monitored computer network, the intercepted data communications associated with a connection request to one or more of the host devices;
determining a number (M) of evaluator elements in the connection request for DoS analysis, wherein each evaluator element is associated with a component of the connection request;
determining a DoS evaluator element score, and starting with a first evaluator element of the M evaluator elements, by analyzing an evaluator element using prescribed criteria to determine the DoS evaluator element score for the analyzed evaluator element;
performing one or more DoS mitigation actions on the connection request if the DoS evaluator element score of the analyzed evaluator element is indicative of a DoS attack and performing no further actions in the network device regarding the connection request;
calculating an evaluator consolidated score consisting of one or more of the respective DoS evaluator element scores associated with respective analyzed evaluator elements not determined indicative of a DoS attack;
determining if each evaluator element of the M evaluator elements has been analyzed to determine a respective DoS evaluator element score;
returning to determining a DoS evaluator element score for a succeeding evaluator element to be analyzed if it is determined each evaluator element of the M evaluator elements has not been analyzed; and
determining if the value of the evaluator consolidated score is indicative of a DoS attack by the connection request if it is determined each evaluator element of the M evaluator elements has been analyzed.

2. The computer method as recited in claim 1, wherein the value M is dependent upon a connection type associated with the connection request.

3. The computer method as recited in claim 2, wherein the connection request is a HTTP connection request and the evaluator elements in connection request include: 1) inter-packet delay; 2) Layer 3/Layer 4 analysis; 3) Layer 7 protocol analysis; and 4) HTTP application activity monitoring, such that the value of M is 4.

4. The computer method as recited in claim 1, wherein performing one or more DoS mitigation actions on the connection request if the DoS evaluator element score of an analyzed evaluator element is indicative of a DoS attack includes comparing a determined DoS evaluator element score against a user predetermined value.

5. The computer method as recited in claim 4, wherein performing one or more DoS mitigation actions on the connection request if the DoS evaluator element score of the analyzed evaluator element is indicative of a DoS attack includes dropping the connection request and blacklisting the connection request.

6. The computer method as recited in claim 1, wherein determining a DoS evaluator element score further includes providing weighted values to one or more of the determined DoS evaluator scores based upon prescribed criteria.

7. The computer method as recited in claim 1, wherein the evaluator consolidated score is an aggregation of each determined DoS evaluator element score.

8. The computer method as recited in claim 1, wherein determining if each evaluator element of the M evaluator elements has been analyzed includes the use of one or more counters.

9. The computer method as recited in claim 1, wherein determining if the value of the evaluator consolidated score is indicative of a DoS attack by the connection request includes comparing the determined evaluator consolidated score against a user predetermined value.

10. The computer method as recited in claim 1, wherein the connection request is layer 7 request.

11. The computer method as recited in claim 1, further including, if the value of the evaluator consolidated score is determined indicative of a DoS attack by the connection request, blacklisting the connection request.

12. The computer method as recited in claim 1, further including, if the value of the evaluator consolidated score is not indicative of a DoS attack by the connection request, whitelisting the connection request.

13. The computer method as recited in claim 1, further including, and prior to determining a number (M) of evaluator elements, the following steps:
determining a client connection identifier (connection id) associated with the connection request;
determining if the connection id is associated with a predetermined DoS attack risk, and if yes, dropping the connection request and performing no further actions in the network device regarding the connection request;
determining if the connection id is associated with a white list, and if yes, permitting network connection of the connection request and performing no further mitigation actions in the network device regarding the connection request; and
if the connection id is neither associated with a predetermined DoS attack nor a whitelist then proceed to determining a number of M evaluator elements for the connection request in the network device.

14. The computer method as recited in claim 13, further including a determining a stream-id for each connection stream in the connection request.

15. The computer method as recited in 1, further including adjusting a confidence score associated with the connection request based upon the source IP address associated with the connection request.

16. The computer method as recited in claim 15, wherein adjusting the confidence score includes referencing the source IP address against a database indicating a severity of a DoS threat associated with the source IP address.

17. A computer system for detecting a Denial of Service (DoS) attack in a network, the computer system comprising:
one or more data bases having memory configured to store instructions;
a processor disposed in communication with said memory, wherein said processor upon execution of the instructions is configured to:
intercept data communications occurring between one or more external computers in a monitored computer network seeking connection with one or more host devices, the intercepted data communications being associated with a connection request to one or more of the host devices;
determine a number (M) of evaluator elements in the connection request, wherein each evaluator element is associated with a component of the connection request;
determine an evaluator element score, and starting with a first evaluator element of the M evaluator elements, analyze an evaluator element to determine the evaluator element score for the analyzed evaluator element;
calculate an evaluator consolidated score consisting of one or more of the respective evaluator element scores associated with respective analyzed evaluator elements not determined indicative of a DoS attack;

determine if each evaluator element of the M evaluator elements has been analyzed to determine a respective evaluator element score;

return to determining an evaluator element score for a succeeding evaluator element to be analyzed if it is determined each evaluator element of the M evaluator elements has not been analyzed;

determine if the value of the evaluator consolidated score is indicative of a DoS attack by the connection request if it is determined each evaluator element of the M evaluator elements has been analyzed, wherein no further actions are performed on the connection request if a determined evaluator element score is indicative of a DoS attack; and perform one or more mitigation actions on the connection request if a determined evaluator element score is determined indicative of a DoS attack.

18. The computer system as recited in claim 17, wherein the network is associated with an application layer DDoS attack.

* * * * *